US008036350B2

United States Patent
Bettis et al.

(10) Patent No.: US 8,036,350 B2
(45) Date of Patent: Oct. 11, 2011

(54) AUDIO CHUNKING

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: Movius Interactive Corp, Johns Creek, GA (US)

( * ) Notice: Subject to any disclaimer, the term of this patent is extended or adjusted under 35 U.S.C. 154(b) by 1035 days.

(21) Appl. No.: 11/687,936

(22) Filed: Mar. 19, 2007

(65) Prior Publication Data

US 2008/0031428 A1    Feb. 7, 2008

Related U.S. Application Data

(63) Continuation of application No. 11/170,529, filed on Jun. 29, 2005, now Pat. No. 7,197,121.

(60) Provisional application No. 60/584,058, filed on Jun. 30, 2004.

(51) Int. Cl.
*H04M 1/64* (2006.01)
(52) U.S. Cl. ................. 379/88.22; 379/88.17; 379/88.18
(58) Field of Classification Search ................ 379/88.16, 379/88.17, 71–74, 88.22, 88.18
See application file for complete search history.

(56) References Cited

U.S. PATENT DOCUMENTS 5,367,609 A   11/1994   Hopper et al.
5,619,554 A    4/1997   Hogan et al.
7,197,121 B2   3/2007   Bettis
2003/0215068 A1  11/2003  Stein et al.
2004/0258219 A1*  12/2004  Breitenbach et al. ...... 379/88.22

FOREIGN PATENT DOCUMENTS

| EP | 0484070 A2 | 6/1992 |
| JP | 01188154 | 7/1989 |
| JP | 11239167 | 8/1999 |
| WO | WO 00/34881 A1 | 6/2000 |
| WO | WO0152509 A2 | 7/2001 |
| WO | WO0228068 A1 | 4/2002 |

* cited by examiner

*Primary Examiner* — Simon Sing
*Assistant Examiner* — Simon King
(74) *Attorney, Agent, or Firm* — Smith Risley Tempel Santos LLC; Gregory Scott Smith

(57) ABSTRACT

A voice mail system that allows for the delivery of voice messages by chunks, thereby optimizing the delivery of the information. When a subscriber attempts to listen to his or her voice mail message, the header information for the first voice mail message is down loaded and played back to the subscriber. While the subscriber listens to the header information, the next two blocks of data of the voice message are downloaded. Upon the completion of the playback of the header information, the first two blocks of the voice mail message are available for playback and the first block is immediately available for playback. As the subscriber listens to the voice mail message subsequent blocks of the first voice mail message, and optionally header information and blocks of subsequent voice mail messages are simultaneously down loaded. Thus, the subscriber is able to seamlessly listen to the voice mail messages without a delay in the retrieval of the voice mail messages regardless of the order the subscriber listens to the messages.

14 Claims, 3 Drawing Sheets

AUDIO CHUNKING

CROSS-REFERENCE TO RELATED APPLICATIONS

This application is a continuation application of U.S. non-provisional application filed on Jun. 29, 2005 now U.S. Pat. No. 7,197,121 pursuant to Title 35, United States Code §100 et seq. and 37 C.F.R. Section 1.53(b) assigned Ser. No. 11/170,529 which application claims priority to the filing date of U.S. Provisional Application for Patent filed on Jun. 30, 2004 entitled AUDIO CHUNKING and having been assigned Ser. No. 60/584,058, which application is hereby incorporated by reference.

BACKGROUND OF THE INVENTION

Alexander Graham Bell's notebook entry of 10 Mar. 1876 describes his successful experiment with the telephone. Speaking through the instrument to his assistant, Thomas A. Watson, in the next room, Bell utters these famous first words, "Mr. Watson—come here—I want to see you." Every since this time, engineers, marketers and consumers have been on a quest for the faster delivery of more information through telecommunication and/or computer networks. In a short period of time, we have moved from 300 baud modems delivering data to the home to full-blown T1 carriers, cable modems and DSL lines bringing data to consumers at millions of bits per second.

Although the technological advances in the speed of data delivery have astonishing, they are still challenged by the imagination of users. As bandwidth and data rate increases, users continue to come up with applications that challenge the capabilities of the current state of technology. Applications that require the downloading of extensive amounts of data, audio files, video files and graphics can easily challenge the bandwidth and data throughput capabilities of home and office network solutions. At the data rates increase, then the quality of the audio, video or other data will also improve, thereby requiring the download of even more data and once again challenging the throughput of the network.

As a result, users are somewhat accustomed, especially in the realm of personal computer applications, to waiting at least some period of time for a data file, audio file, video file or graphics file to download before they can utilize the file. More specifically, for downloading audio files, the users are used to waiting several seconds while a streamed audio file is downloaded, or at least a significant amount of the file is loaded into a buffer.

In the context of a voice mail system, such delays are not acceptable. Thus, there is a need in the art for a technique to minimize or alleviate the delay experienced by a user downloading an audio file, especially in the context of the delivery of voice mail message through a telecommunications system.

BRIEF SUMMARY OF THE INVENTION

The present invention satisfies the above-listed needs in the art, as well as other needs, by providing a technique for downloading files on a chunk by chunk basis, maintaining sufficient data on the target destination to ensure uninterrupted playback or access to the data. In general, when the download of a file is requested, two portions of the file are transferred to the requesting target. While the first portion of the file is being played back or utilized, a third portion of the file is downloaded. This operation continues until the entire file is downloaded or the user has requested the download to stop. As a result the user is able to access the data in an uninterrupted manner with minimal delay.

In one embodiment, the present invention is incorporated into a voice mail system to facilitate the access of voice messages by subscribers. When a subscriber attempts to retrieve a voice mail message, the metadata, the first portion or first two chunks of the file are downloaded to the requesting target. Once downloaded, which takes place in a short period of time, the playback commences. While the playback of a first portion of the voice mail message is active, a next portion of the message is downloaded to the subscriber. Thus, the subscriber has continuous feed of the audio with minimal delay. Advantageously, the present invention provides a continuous playback of audio and/or video files with requiring extensive buffering at the target destination, without incurring a significant delay in the reception of the start of the audio and/or video, and provide continuous playback of the content.

DETAILED DESCRIPTION OF THE INVENTION

The present invention is directed towards the provision of audio messages using a chunking technique, or the delivery of the audio in small pieces. This invention involves, breaking the audio message into several pieces or chunks. Initially, when a user requests the download of the audio message, two chunks are immediately downloaded. Once the first two chunks are delivered, the first chunk begins to be played back to the user. While the first chunk is being played, a third chunk is downloaded. Upon the completion of the playback of the first chunk, the playback of the second chunk is commenced, the third chunk is fully downloaded, and the down load of a next chunk is initiated.

Advantageously, aspects and embodiments of the present invention provide a seamless audio interface from the user's perspective with unnoticeable delay in playback. The delivery of the audio can be performed using a TCP/IP protocol that provides ordering and retransmission, or some other similar or similarly functional protocol that can provide some level of reception assurance and packet ordering. The chunk sizes are chosen so as to minimize the delivery of the initial download, and provide a level of assurance that continuous audio will be available to the user.

United States patent application filed on Mar. 15, 2005, and assigned Ser. No. 11/080,744 describes a distributed IP architecture for telecommunications voice mail system. The contents of this application are incorporated herein by reference.

Figure 1:
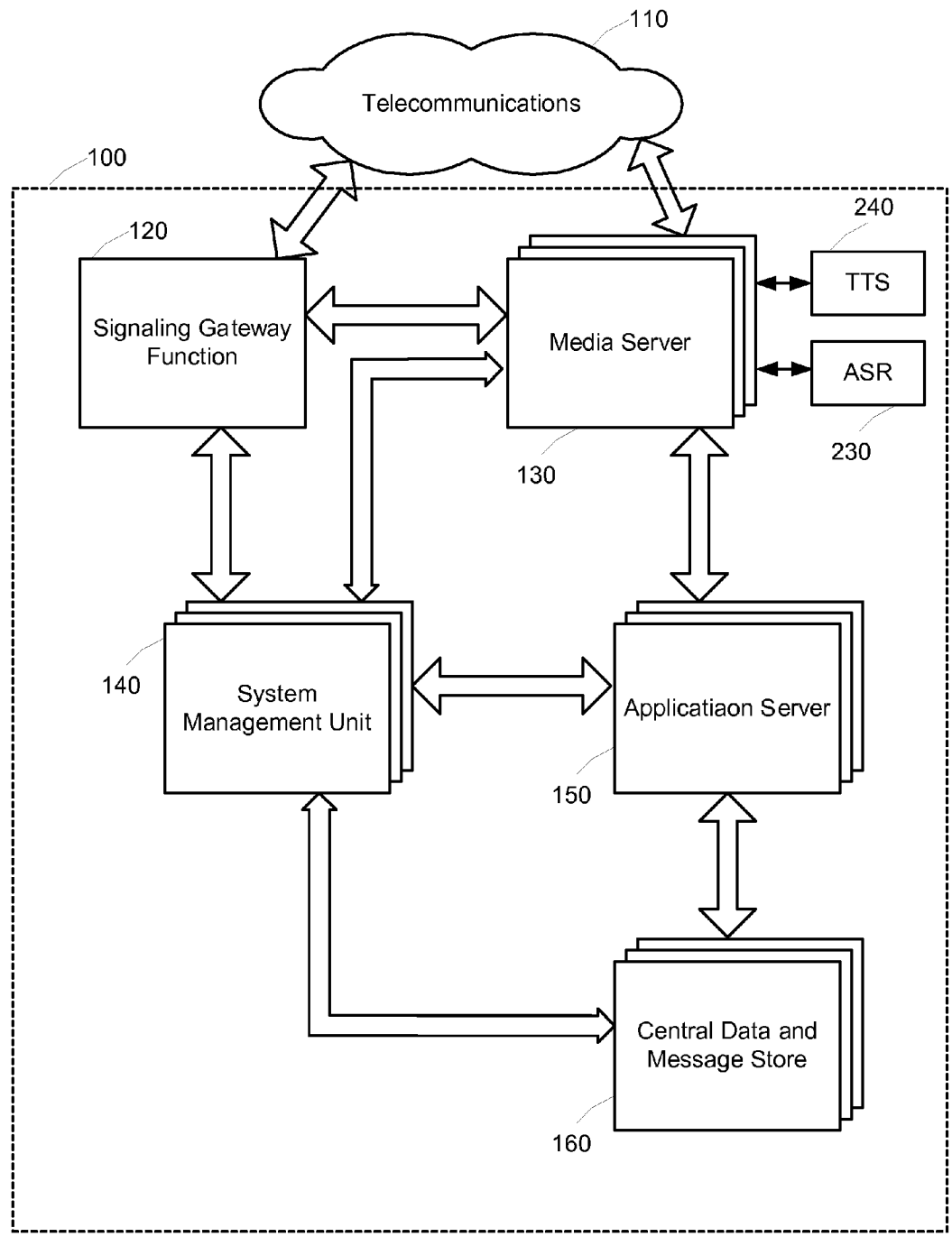
FIG. 1 is a system diagram illustrating the components and the connectivity of an exemplary next-generation communications platform in which the present invention can be incorporated.

FIG. 1 is a system diagram illustrating the components and the connectivity of an exemplary next-generation communications platform in which the present invention can be incorporated. The illustrated system includes a distributed IP-based architecture for telecommunications equipment that, among other things, can provide telecommunication services such as voice mail, call forwarding and other telecommunication features. In the illustrated embodiment, the next-generation communications platform 100 has a distributed IP architecture and is connected to the Public Switched Telephone Network (PSTN) or a Mobile Switching Network (MSC) 110. The communications platform 100 is illustrated as including a signaling gateway function (SGF) 120, one or more media servers (MS) 130, one or more system management units (SMU) 140, one or more application servers (AS) 150 and one or more central data and message store (CDMS) or next generation message storage device (NGMS) 160. It should be understood that the distribution of functionality illustrated in the figures and described is not the only acceptable platform, and aspects of the present invention could be incorporated into a system that includes fewer or more components and a different arrangement of functionality among the components.

In the illustrated distributed system, problems associated with the download and playback of voice mail messages are introduced. Rather than a subscriber calling into a system dedicated to providing the voice messages, such a system is required to deliver the messages over an IP network to the media server. This can result in significant delays in the retrieval of the messages and also result in dead space between messages or portions of the message. The present invention provides for the seamless delivery of voice messages through audio chunking.

In general, the SGF 120 serves as the Signaling System 7 (SS7) interface to the PSTN, MSC or other telecommunications network 110. The media server 130 terminates IP and/or circuit switched traffic from the telecommunications network via a multi-interface design and is responsible for trunking and call control. The application server module 150 generates dynamic VoiceXML pages for various applications and renders the pages through the media server 130 and provides an external interface via a web application server configuration. The SMU 140 is a management portal that enables service providers to provision and maintain subscriber accounts and manage network elements from a centralized web interface. The CDMS 160 stores voice messages, subscriber records, and manages specific application functions including notification. Each of these sub-systems are described in more detail following.

Each of the components in the next-generation communications platform is independently scalable and independently interconnected onto an IP network. Thus, the components can be geographically distributed but still operate as a single communications platform as long as they can communicate with each other over the IP network. This is a significant advantage of the present invention that is not available in state-of-the-art communication systems.

The MS 130 terminates IP traffic from the SGF 120 and circuit-switched traffic from the PSTN 110. The MS 130 is responsible for call set up and control within the platform architecture. The MS 130 processes input from the user in either voice, DTMF format or other signaling scheme (much like a web client gathers keyboard and mouse click inputs from a user). The MS 130 then presents the content back to the user in voice form (similar in principle to graphic and text displayed back to the user on a PC client). This client/server methodology is important in the platform architecture in that it enables rapid creation of new applications and quick utilization of content available on the World Wide Web. The client/server architecture also is an enabler for the ability of the system to be geographically distributed.

Voice messages that are left for a subscriber are stored in the CDMS 160 and can be retrieved by the subscribers at a later time. When a subscriber retrieves voice messages, the audio messages are delivered to a Media Server 130 from the CDMS 160 via one or more Application Servers 150. Advantageously, the audio messages can be interleaved and thus, multiple voice message playbacks for multiple users can be accommodated.

Figure 2:
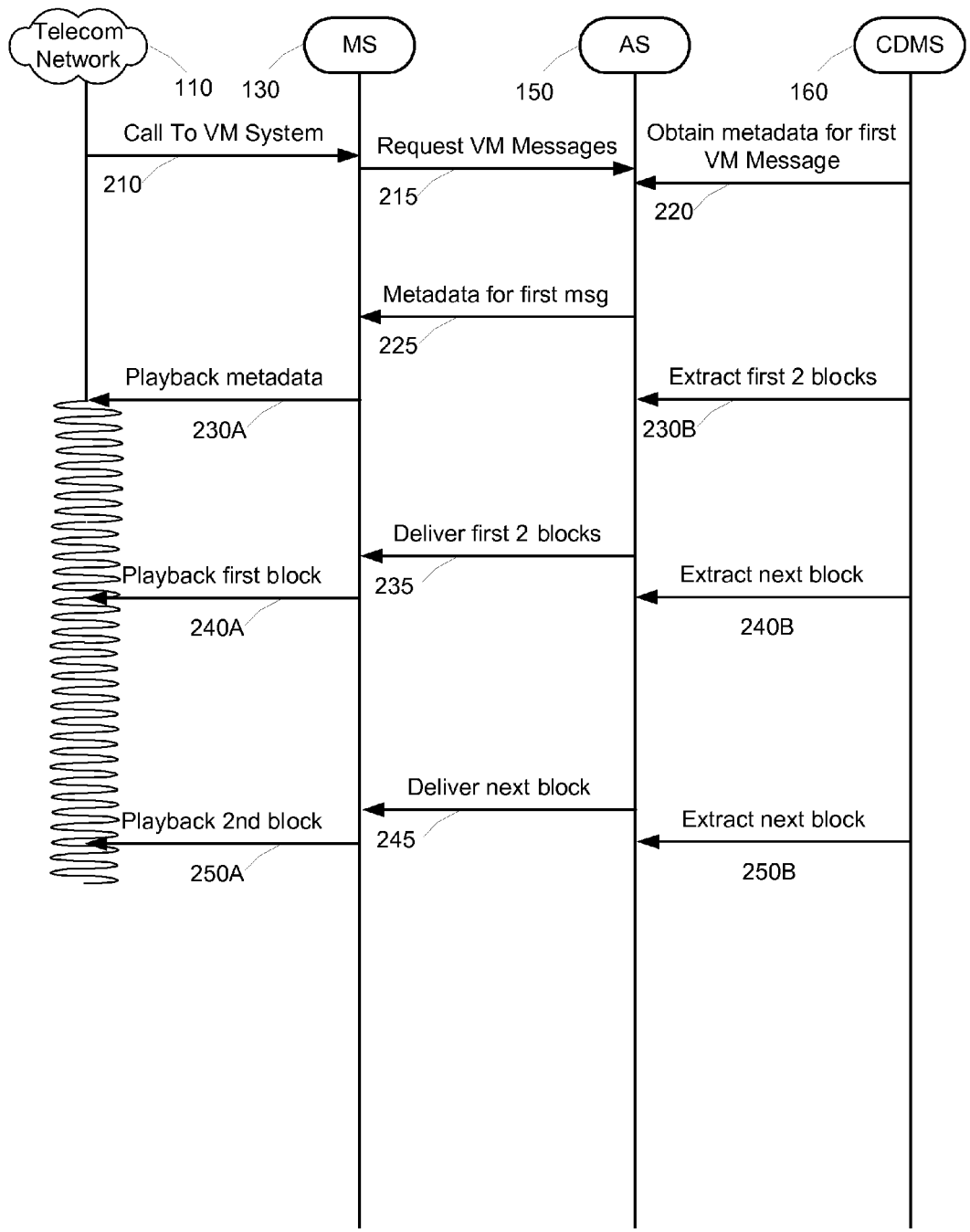
FIG. 2 is a flow diagram illustrating the operation of an exemplary embodiment of the present invention.

FIG. 2 is a flow diagram illustrating the operation of an exemplary embodiment of the present invention. Although this embodiment is described within a voice mail retrieval environment, it will be appreciated that the various aspects of the present invention can be employed in a variety of environments. In the described embodiment, it is assumed that the distributed voice mail system has received a plurality of voice messages for a particular subscriber. At step 210, the MS 130 receives an incoming call from a subscriber requesting to review the voice mail messages. At this point it is necessary for the MS 130 to extract the voice mail messages from the CDMS 160 or next generation message system (NGMS). At step 215, the MS 130 requests the subscriber's voice mails to be retrieved. In the illustrated embodiment this is shown as placing a request to the AS 150. At step 220, the AS 150 retrieves the header or metadata information from the NGMS 160 and provides this information to the MS 130 at step 225. The metadata is relatively small block of data and is transferred rather quickly. In an exemplary embodiment, the metadata includes header information. As a non-limiting example, the header information can include the time the message was received, the length of the message, the identity of the sender of the message, the priority of the message, the class or type of message, etc. The MS 130 and the AS 150 cooperate to convert the metadata into a VXML page and begin to render it to the caller 230A. The AS 150 operates simultaneously to extract blocks of the voice message associated with the metadata 230B. In an exemplary embodiment, two blocks of 16 K byte portions of the voice data are retrieved while the metadata VXML is played for the caller. At step 235, the two blocks or chunks are delivered to the MS 130 for playback once the AS 150 retrieves them from the CDMS 160. Once the metadata is completed, the caller can immediately begin the playback of the voice message by playing back the first block 240A. Simultaneously, the AS 150 proceeds to extract the next block of the voice message from the CDMS 160 at step 240B and delivers the next block to the MS 130 at step 245. The MS 130, after rendering the first block to the calling subscriber, begins to render the second block 250A while the AS 150 retrieves the next block from the CDMS 160 at step 250B. Thus, the system operates to always keep at least one block ahead of the playback of the message. Thus, while the caller listens to the first block, the third block is requested by the AS 150 and provided to the MS 130. It should be appreciated that the present invention can also be implemented in a "just-in-time" fashion. This means that rather than ensuring that the delivery of the voice message is at least one block ahead of the playback, the deliver of the next block of the voice message can be made just in time for playback before the preceding block is completed.

One advantage of the present invention is ability to minimize the amount of data downloaded if a user simply wants to scan his or her messages. For instance, if a user requests the download of a voice message, two chunks of the voice message can be downloaded and playback can commence. If the user decides to delete or skip this message, the user can so instruct the MS 130 through either a voice command or a DTMF command. While the system is processing the user's action the first two chunks of the next message can be downloaded. For instance, if while the user is listening to a message, the user elects to skip the rest of the message and go to the next message, the metadata for the next message is then extracted from the NGMS 160 (unless it was previously extracted) and converted to a VXML page (unless it was previously converted) and then rendered to the MS 130. Again, while the metadata VXML is being rendered, the AS 150 retrieves the first two blocks of the next voice message. Thus, rather than downloading an entire message or series of messages, only the content that is imminently necessary for the user is downloaded.

Figure 3:
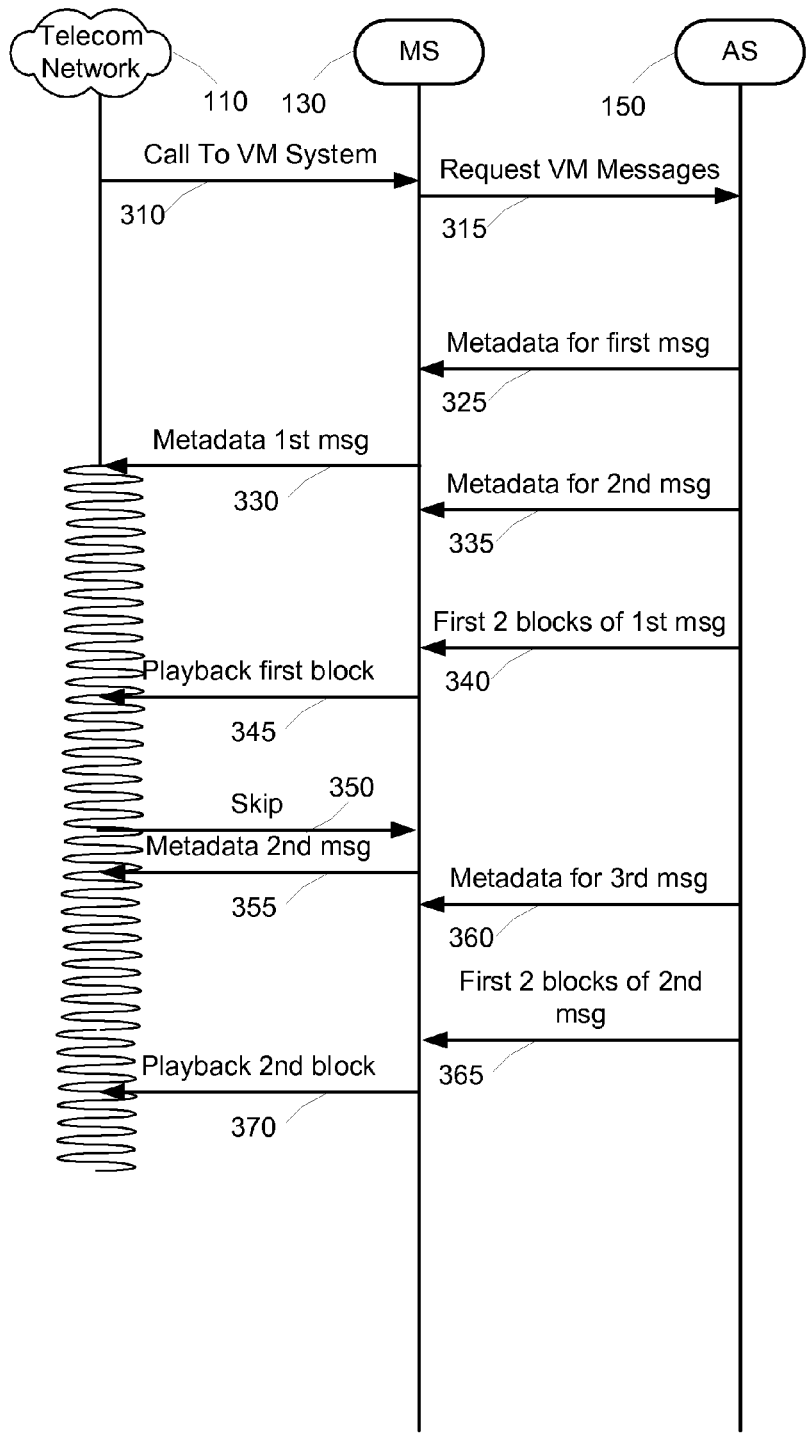
FIG. 3 is a timing diagram illustrating another embodiment of the present invention.

FIG. 3 is a timing diagram illustrating another embodiment of the present invention. In this diagram, the CDMS has been excluded for simplification purposes. At step 310 the MS 130 receives a request from a subscriber via telecommunications network 110 to retrieve his or her voice mail messages. At step 315 the MS 130 requests the subscriber's voice mail messages from the AS 150. At step 325, the AS 150 delivers the metadata of the first voice message to the MS 130 which then begins to render the metadata to the subscriber at step 330. The AS 150 then proceeds to extract the metadata for the second voice mail message at step 335 and the first two blocks of the first voice mail message at step 340. At step 345, the playback of the metadata for the first message is complete and the MS 130 begins the playback of the first block of the first message. If the subscriber elects to skip the remainder of this message 350, the MS 130 has already received the metadata for the second voice mail message and thus, it immediate begins the playback of the second voice mail message metadata 355. During the playback of the metadata for the second voice mail message, the AS 150 retrieves the metadata for a third voice mail message is any 360 and the first two blocks of the second voice mail message 365. Upon completion of the playback of the metadata for the second voice mail message, the MS 130 has received the blocks of the second message and immediately commences the playback of the first block 370.

In another embodiment, a smart downloading of the audio chunks can be performed. For instance, if a user has multiple audio files to be downloaded, such as a series of voice mail messages or several songs selected from an MP3 download cite, etc, the smart downloading can be applied incorporating aspects of the present invention. In this embodiment, the metadata for the first audio file is downloaded and rendered to the user while the next block is being retrieved. If the block sizes are chosen such that the playback time exceeds the average download time, then eventually the entire audio file will be downloaded but the playback will still be in process. This aspect of the present invention is based on this characteristic. In one embodiment, once the first file is completely downloaded, the present invention can operate to start a download of the second file. Thus, the user is able to transition to the next file without any lag time.

In another embodiment, most applicable to a voice mail environment but not limited to such environment, the chunk sizes are chosen such that the playback time exceeds the average download time. During the download of a first file, a block count is maintained. Once enough chunks have been downloaded to ensure that playback time remaining exceeds the chunk download time by at least a factor of 2, chunks of the second file are then downloaded. In a high-speed delivery network, this aspect of the invention can be applied in a cascaded manner so that portions of multiple files are simultaneously downloaded, and the user is able to experience uninterrupted playback regardless of whether the user listens to the entire files sequentially or, skips or deletes messages before listening to them through completion, or skips over messages or recalls messages directly.

In an application of the smart download, the strategy for the download can change in response to the user's activities. For instance, if the smart download is able to download multiple messages, if the user skips to another message, the messages being downloaded by the invention can be adjusted. For example, suppose a user is listening to the playback of a first audio file 1. While the user is listening, the remainder of the first audio file, along with portions of the next N audio files can be downloaded. If the user elects the playback of message X, then the download of file X can be initiated and once playback commences, the download of the next N audio files after message X can be initiated.

In an exemplary and non-limiting embodiment, the size of the audio chunks can be between 1 to 5 seconds. The present invention is applicable to, but not limited to, the downloading of audio, video and data. The invention can work with a variety of file types in a variety of formats and using a variety of delivery mechanisms and protocols.

The present invention has been described using detailed descriptions of embodiments thereof that are provided by way of example and are not intended to limit the scope of the invention. The present invention can be implemented as a process that runs within a variety of system environments or as an entire system including various components. The described embodiments comprise different features, not all of which are required in all embodiments of the invention. Some embodiments of the present invention utilize only some of the features, aspects or possible combinations of the features or aspects. Variations of embodiments of the present invention that are described and embodiments of the present invention comprising different combinations of features noted in the described embodiments will occur to persons of the art.

What is claimed is:

1. A method for seamlessly delivering information messages to a subscriber of a voice mail system, the method comprising the steps of:
   receiving a request for the retrieval of a subscriber's voice messages;
   retrieving header information pertaining to at least one of the voice messages;
   rendering the header information on a VXML based device;
   prior to completing the rendering of the header information, retrieving at least a first portion of a selected first voice message;
   upon completing the rendering of the header information, commencing the rendering of the retrieved at least a first portion of the selected first voice message; and
   prior to completing the rendering of the retrieved at least a first portion of the selected first voice message, retrieving at least a next portion that comprises either the next portion of the selected first voice message or at least a first portion of a selected second voice message.

2. The method of claim 1, wherein the header information is general metadata associated with each of the available voice messages.

3. The method of claim 2, wherein the step of retrieving at least a first portion of the first voice message further comprises retrieving the first two blocks of the first voice message.

4. The method of claim 3, wherein the step of retrieving at least a next portion comprises retrieving a third block of the first voice message.

5. The method of claim 1, further comprising the step or receiving a skip indicator during the playing back of the first portion of the first voice message.

6. The method of claim 5, wherein in response to receiving the skip indicator, begin the playback of the first portion of the second voice message.

7. A method for seamlessly delivering voice messages to a subscriber of a voice mail system, the method comprising the steps of:

receiving a request from a subscriber device for the retrieval of a subscriber's voice messages;

retrieving the metadata associated with a first voice message;

playing back the first portion of the first voice message by converting the metadata to VXML and rendering the VXML to a VXML device;

simultaneously with the playing back of the first portion of the first voice message, retrieving a next portion of the first voice message;

playing back the next portion of the first voice message upon completion of playing back the first portion; and simultaneously with the playing back of the next portion, retrieving a further next portion of the first voice message.

8. The method of claim 7, wherein the step of retrieving a next portion of the first voice message comprises retrieving a first block and a second block of the first voice message.

9. The method of claim 8, further comprising the step of receiving an indicator from the subscriber device to playback a different voice message and, in response to receiving the indicator, retrieving a first portion of the different voice message.

10. A distributed telecommunications system that provides a seamless telecommunications system for a plurality of geographically dispersed components, the distributed telecommunications system comprising:

a signaling gateway, the signaling gateway including:
    a signaling interface to a telephone network; and
    an interface to an IP network;
a media server, the media server:
    including a circuit-switched interface for receiving and initiating telephone services over the telephone network;
    including an interface to the IP network;
    being operable to provide communication services over the circuit-switched interface; and
    being able to receive command and response input over the telephone network;
an application server, the application server including an interface to the IP network over which the application server is operable to:
    receive and process command and response input received by the media server; and
    serve communication services applications to the media server in response to the media server invoking a communication service and in accordance with the received command and response input; and at least one central data and message store, the at least one central message and data store being operable to:
    receive and store responses from the application server; and
    provide configuration data to the application server, the configuration data influencing the provision of the communication services applications;

wherein, in response to the media server receiving a command to play back voice messages for a subscriber:
    the media server requesting the application server to retrieve the voice messages from the central data and message store;
    the application server retrieving metadata related to at least a first voice message and providing the metadata to the media server;
    while the media server plays back the metadata, the application server retrieving a first block and a second block of the voice message and providing the first block and the second block of the voice message to the media server; and
    while the media server plays back the first block of the voice message, the application server retrieving a next block of the first voice message and providing the next block of the first voice message to the media server.

11. The distributed telecommunications system of claim 10, wherein while the media server plays back the first block of the first voice message, the application server is further operative to retrieve a first block of a next voice message and provide the first block of the next voice message to the media server.

12. The distributed telecommunications system of claim 11, wherein in response to the media server receiving an indicator to playback the next voice message subsequent to commencing the play back of a block of the first voice message, the media server is operative to cease the play back of the block of the first voice message and commence the play back of the first block of the next voice message.

13. The distributed telecommunications system of claim 12, wherein the application server, in response to the media server commencing with the play back of the first block of the next voice message, retrieving a second block of the next voice message and providing the second block of the next voice message to the media server.

14. The distributed telecommunications system of claim 13, wherein while the media server plays back the first block of the next voice message, the application server retrieves a third block of the next voice message and provides the third block of the next voice message to the media server.

* * * * *